United States Patent
Cao et al.

(10) Patent No.: US 11,232,232 B1
(45) Date of Patent: Jan. 25, 2022

(54) IMAGE PRIVACY PROTECTION METHOD, APPARATUS AND DEVICE

(71) Applicant: Alipay (Hangzhou) Information Technology Co., Ltd., Zhejiang (CN)

(72) Inventors: Jiajiong Cao, Zhejiang (CN); Liang Li, Zhejiang (CN); Jingting Ding, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/362,748

(22) Filed: Jun. 29, 2021

(30) Foreign Application Priority Data

Jul. 17, 2020 (CN) .......................... 202010690252.7

(51) Int. Cl.
*G06F 21/62* (2013.01)
*G06T 9/00* (2006.01)
(Continued)

(52) U.S. Cl.
CPC ........ *G06F 21/6245* (2013.01); *G06F 21/602* (2013.01); *G06K 9/00268* (2013.01); *G06T 9/00* (2013.01)

(58) Field of Classification Search
CPC ........ G06F 21/60; G06F 21/602; G06F 21/62; G06F 21/6209; G06F 21/6245; G06K 9/00221; G06K 9/00268; G06T 9/00
See application file for complete search history.

(56) References Cited

U.S. PATENT DOCUMENTS

| | | | |
|---|---|---|---|
| 8,189,781 B1 * | 5/2012 | Hartman | G09C 5/00 380/210 |
| 2007/0153091 A1 * | 7/2007 | Watlington | H04N 21/233 348/208.14 |

(Continued)

FOREIGN PATENT DOCUMENTS

| | | |
|---|---|---|
| CN | 105957001 A | 9/2016 |
| CN | 108365947 A | 8/2018 |

(Continued)

OTHER PUBLICATIONS

Rong, "Research and Design of Digital Image Encryption Algorithm Based on Chaos," B.E. (Hankou University) 2012, 68 pages.

*Primary Examiner* — Khang Do
(74) *Attorney, Agent, or Firm* — Seed IP Law Group LLP (57) ABSTRACT

The implementations of the present specification provide an image privacy protection method, apparatus, and device. The method includes: performing privacy content recognition on an original image; in response to a privacy content being recognized, determining a local region including the privacy content from the original image; performing privacy protection processing on image data for the determined local region to generate data of a privacy-protected original image, the privacy protection processing including at least one of image scrambling processing or image obfuscation processing; and performing image compression processing on the data of the privacy-protected original image to generate data of a compressed image, and using the compressed image as image data to be transmitted or stored. The image privacy protection method, apparatus, and device can solve problems in the existing technologies that cause privacy-protected images to be vulnerable to brute force cracking and their original images to be difficult to restore.

20 Claims, 3 Drawing Sheets

(51) Int. Cl.
*G06K 9/00* (2006.01)
*G06F 21/60* (2013.01)

(56) References Cited

U.S. PATENT DOCUMENTS

| | | | | |
|---|---|---|---|---|
| 2009/0245511 | A1* | 10/2009 | Nakagata | H04N 1/44 |
| | | | | 380/54 |
| 2013/0035979 | A1* | 2/2013 | Tenbrock | G06Q 30/02 |
| | | | | 705/7.29 |
| 2014/0201844 | A1* | 7/2014 | Buck | G06F 21/554 |
| | | | | 726/26 |
| 2015/0104080 | A1* | 4/2015 | Holman | G06F 21/6209 |
| | | | | 382/115 |
| 2015/0106628 | A1* | 4/2015 | Holman | G06F 21/602 |
| | | | | 713/189 |
| 2016/0148000 | A1* | 5/2016 | Krutsch | G06F 21/79 |
| | | | | 380/28 |
| 2017/0372046 | A1* | 12/2017 | Thomee | G06F 21/31 |
| 2018/0060542 | A1 | 3/2018 | Anders et al. | |
| 2018/0075290 | A1* | 3/2018 | Chen | G06K 9/00248 |
| 2018/0114595 | A1* | 4/2018 | Stern | H04L 67/1004 |
| 2018/0268240 | A1* | 9/2018 | Loce | G11B 27/105 |
| 2019/0377901 | A1 | 12/2019 | Balzer et al. | |
| 2021/0158936 | A1* | 5/2021 | Rao | G16H 50/20 |
| 2021/0203886 | A1* | 7/2021 | Byrne | G06T 5/40 |

FOREIGN PATENT DOCUMENTS

| | | |
|---|---|---|
| CN | 110135195 A | 8/2019 |
| CN | 111260537 A | 6/2020 |
| CN | 111401320 A | 7/2020 |
| EP | 2945098 A1 | 11/2015 |
| WO | WO 2006006081 A2 | 1/2006 |

\* cited by examiner

IMAGE PRIVACY PROTECTION METHOD, APPARATUS AND DEVICE

BACKGROUND

Technical Field

The present specification relates to the field of image processing, and in particular, to an image privacy protection method, apparatus and device.

Description of the Related Art

In recent years, biometric technologies have been well developed and implemented, but the accompanying privacy and security issues are becoming increasingly prominent. Because biometric systems need to collect, process, transmit, and store users' biometric images, attackers may attack the systems and steal the users' information in these processes, threatening the users' privacy security.

Conventional image encryption algorithms are independent on image compression algorithms, and usually implement encryption by simply rotating or obscuring images. The conventional image encryption algorithms have low complexity and less diversified modes. Therefore, attackers can easily decrypt images by brute force or simply guessing.

Feature storage-based privacy protection methods do not store original images locally but only save biometric features of users (some array vectors, with which the original images usually cannot be obtained in reverse). Therefore, attackers cannot obtain the original images even if they crack the systems. However, such methods cannot solve problems such as site restoration and public opinion screening, because solving these problems relies on assistance of the original images. For example, when a user complains about misrecognition occurring in a biometric system, an engineer cannot locate the problem or respond to the user as the engineer cannot obtain an original image of an involving transaction.

BRIEF SUMMARY

The present specification provides an image privacy protection method, apparatus, and device, to solve problems in the existing technologies that privacy-protected images are vulnerable to brute force cracking and their original images are difficult to restore.

The implementations of the present specification includes the following technical solutions:

According to a first aspect, an implementation of the present specification provides an image privacy protection method, including: performing privacy content recognition on an original image; in response to a privacy content being recognized, determining a local region including the privacy content from the original image; performing privacy protection processing on image data for the determined local region to generate data of a privacy-protected original image, the privacy protection processing including at least one of image scrambling processing or image obfuscation processing; and performing image compression processing on the data of the privacy-protected original image to generate data of a compressed image, and using the compressed image as image data to be transmitted or stored.

According to a second aspect, an implementation of the present specification provides an image privacy protection apparatus, including: a content recognition module, configured to perform privacy content recognition on an original image; a region determining module, configured to, if privacy content is recognized, determine a local region including the privacy content from the original image; an image processing module, configured to perform privacy protection processing on image data for the determined local region, the privacy protection processing including at least one of image scrambling processing or image obfuscation processing; and an image compression module, configured to perform image compression processing on the data of the privacy-protected original image to generate data of a compressed image, and use the compressed image as image data to be transmitted or stored.

According to a third aspect, an implementation of the present specification provides an image privacy protection device, including: a processor; and a memory, configured to store computer-executable instructions that, when executed, cause the processor to: perform privacy content recognition on an original image; if privacy content is recognized, determine a local region including the privacy content from the original image; perform privacy protection processing on image data for the determined local region, the privacy protection processing including at least one of image scrambling processing or image obfuscation processing; and perform image compression processing on the data of the privacy-protected original image to generate data of a compressed image, and use the compressed image as image data to be transmitted or stored.

According to a fourth aspect, an implementation of the present specification provides a storage medium. The storage medium is configured to store computer-executable instructions. When executed, the computer-executable instructions implement the following process: performing privacy content recognition on an original image; in response to a privacy content being recognized, determining a local region including the privacy content from the original image; performing privacy protection processing on image data for the determined local region to generate data of a privacy-protected original image, the privacy protection processing including at least one of image scrambling processing or image obfuscation processing; and performing image compression processing on the data of the privacy-protected original image to generate data of a compressed image, and using the compressed image as image data to be transmitted or stored.

According to the image privacy protection method, apparatus, and device, privacy content recognition is performed on an original image; if privacy content is recognized, a local region including the privacy content is determined from the original image; privacy protection processing is performed on image data for the determined local region, the privacy protection processing including at least one of image scrambling processing or image obfuscation processing; and image compression processing is performed on the privacy-protected original image, and the compressed image is used as an image to be transmitted or stored. Based on this, with privacy content flexibly specified, it is feasible to flexibly select, from an original image, image data in a local region on which privacy protection processing is to be performed, thereby improving the privacy protection strength for the original image, and easily realizing restoration of the original image.

BRIEF DESCRIPTION OF THE SEVERAL VIEWS OF THE DRAWINGS

To describe the technical solutions in one or more implementations of the present specification or in the existing technologies more clearly, the following briefly describes the accompanying drawings required for describing the implementations or the existing technologies. Clearly, the accompanying drawings described below are merely some implementations of the present specification, and a person of ordinary skill in the art can derive other drawings from these accompanying drawings without making innovative efforts.

DETAILED DESCRIPTION

To make a person skilled in the art better understand the technical solutions in the implementations of the present specification, the following clearly and completely describes the technical solutions in the implementations of the present specification with reference to the accompanying drawings in the implementations of the present specification. Clearly, the described implementations are merely some rather than all of the implementations of the present specification. All other implementations obtained by a person of ordinary skill in the art based on one or more implementations of the present specification without making innovative efforts shall fall within the protection scope of the present specification.

Figure 1:
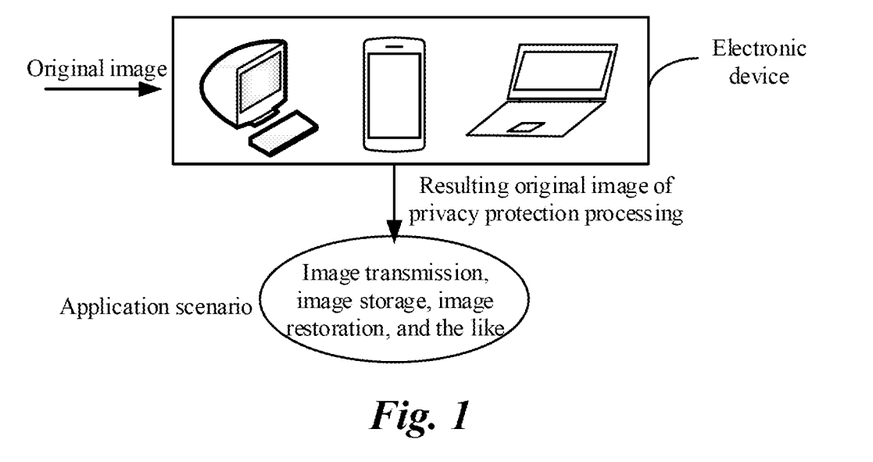
FIG. 1 is a schematic scene diagram illustrating an image privacy protection method according to an implementation of the present specification.

FIG. 1 is a schematic scene diagram illustrating an image privacy protection method according to an implementation of the present specification. As shown in FIG. 1, the scene includes an electronic device and application scenarios associated with image privacy protection in which the electronic device is located. The electronic device can be a mobile phone, a tablet computer, a desktop computer, a portable notebook computer, or the like. The electronic device is embedded with a privacy protection apparatus for performing privacy protection processing on original images. The privacy protection apparatus can be used to perform processing such as image recognition, at least one of image scrambling processing or image obfuscation processing, image compression, and other processing on images. The application scenarios associated with image privacy protection include transmitting privacy-protected images between different electronic devices, storing the privacy-protected images locally, on the cloud, or on other electronic devices, restoring original images from the privacy-protected images on a device with a legal permission, and the like.

When the electronic device obtains original data to be processed and performs privacy protection processing on the original data to apply a privacy-protected original image to any of the application scenarios above, the electronic device can randomly select an image in a local region including user-defined privacy content from the original image to perform privacy protection processing, so as to obtain the privacy-protected original image.

For example, after obtaining the original data to be processed, the electronic device can first perform privacy content recognition on the original image; if the privacy content is recognized, determine a local region including the privacy content from the original image, where the privacy content can be user-defined image content; after a local region including the privacy content is determined, perform privacy protection processing on image data for the local region, the privacy protection processing including at least one of image scrambling processing or image obfuscation processing; and perform image compression processing on the data of the privacy-protected original image to generate data of a compressed image, and use the compressed image as image data to be transmitted or stored. The final resulting image can be transferred and used in any of the application scenarios shown in FIG. 1. As the privacy-protected original image is obtained by performing the privacy protection processing on the image data for the local region including the privacy content in the original image, the privacy-protected image data for the local region can be flexibly selected by specifying the privacy content to be recognized. Such practice increases difficulty in restoration from the privacy-protected original image to some extent. As a result, it is difficult for an attacker to determine the privacy-protected local region image, and therefore the attacker cannot quickly restore the original image through conventional decryption and decompression methods. In addition, by performing the privacy protection processing on the image in the local region including the privacy content, the amount of image data to be processed can be effectively reduced. As such, a privacy protection processing speed can be increased, and the original image can be quickly restored by enabling a device with a legal permission to restore and process less privacy protection data, thereby shortening a restoration processing time and restoring the original image.

Further, during the privacy content recognition on the original image, facial recognition can be performed on the original image, and if a face image is recognized, the recognized face image is used as the privacy content; and/or semantic analysis is performed on text information in the original image, and in response to an analysis result being relevant to a user's privacy information, the text information is used as the privacy content.

Further, during the privacy protection processing on the image data for the determined local region, the image data for the local region can be encrypted by using a nonlinear hyperchaotic system to obtain encrypted image data; the encrypted image data and the original image data for the local region can be superimposed to obtain scrambled image data, and this image data can be used as privacy-protected image data; or a data order of the image data for the local region can be rearranged to obtain obfuscated image data, and this image data can be used as privacy-protected image data.

Further, during the privacy protection processing on the image data for the determined local region, the image data for the local region can be encrypted by using a nonlinear hyperchaotic system to obtain encrypted image data; then, the encrypted image data and the original image data for the local region can be superimposed to obtain scrambled image data; and finally a data order of the scrambled image data can be rearranged to obtain obfuscated image data, and this image data can be used as privacy-protected image data; or a data order of the image data for the local region can be first rearranged to obtain obfuscated image data; then, the obfuscated image data can be encrypted by using a nonlinear hyperchaotic system to obtain encrypted image data; and finally the encrypted image data and the original image data for the local region can be superimposed to obtain scrambled image data, and this image data can be used as privacy-protected image data.

Further, during the image obfuscation processing on the image data for the local region or on the scrambled image data, the image obfuscation processing can be performed on the image data for the local region or on the scrambled image data generated based on the image data for the local region using a predetermined obfuscation circuit.

Further, when the local region including the privacy content is determined from the original image, a location of the privacy content can be determined from the original image; and at least one non-overlapped local region that includes the privacy content on the whole can be determined from the original image based on the location of the privacy content. For example, when the original image includes a large number of face images, or locations of face images correspond to a large region or scattered regions, multiple non-overlapped local regions can be determined based on the locations of the face images. A region formed by adding these local regions includes the locations of the face images in the original image.

Further, when at least one non-overlapped local region that includes the privacy content on the whole is determined from the original image based on the location of the privacy content, in response to the privacy content being a face image, a closed region is formed through boundaries of a location of each face image on the original image, and a regular-pattern region including the closed region in the original image is used as one local region, where each local region includes only one closed region and the regular-pattern region including the closed region can be a rectangular region.

Further, during execution of the above image privacy protection processing, in response to at least two non-overlapped local regions being determined from the original image as including the privacy content, respective image data of non-overlapped local regions of the at least two non-overlapped local regions are processed differently in at least one of image scrambling processing or image obfuscation processing in the privacy protection processing, so as to increase the complexity of the privacy protection processing and increasing the difficulty of restoration from the privacy-protected original image.

Further, when the data compression processing is performed on the privacy-protected original image, overall encryption processing can be performed on the privacy-protected original image, and the image compression processing can be performed on the overall encrypted original image.

The following further describes the technical solutions of the present specification by using multiple implementations.

Figure 2:
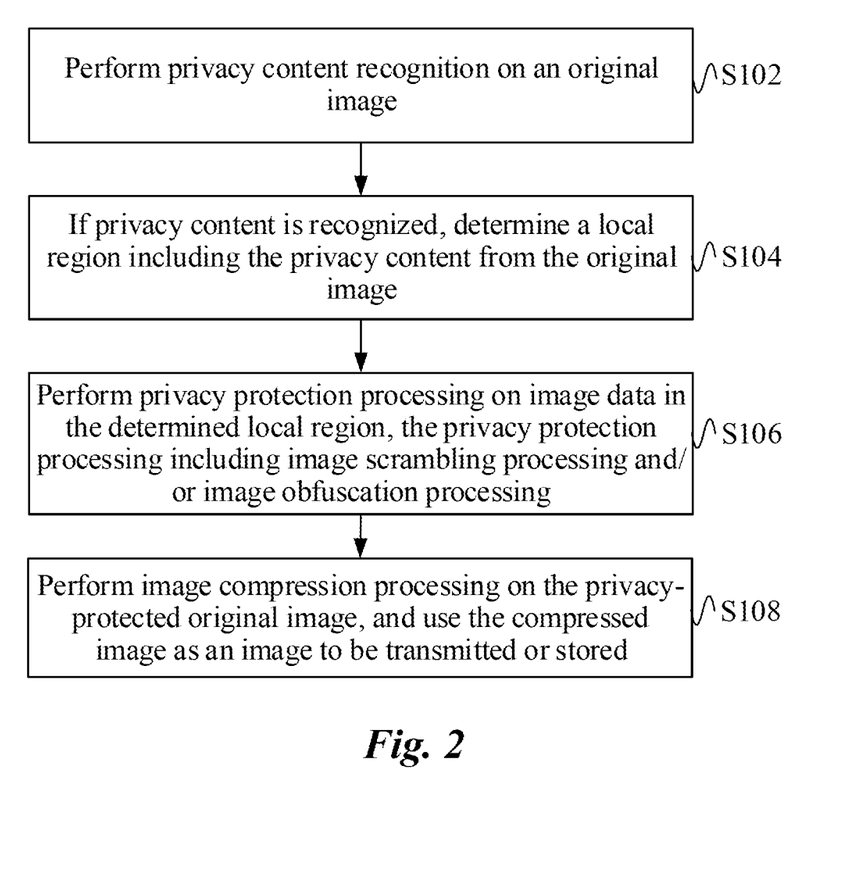
FIG. 2 is schematic flowchart 1 illustrating an image privacy protection method according to an implementation of the present specification.

Based on the architecture for the application scenarios above, FIG. 2 is schematic flowchart 1 illustrating an image privacy protection method according to an implementation of the present specification. The method in FIG. 2 can be executed by the electronic device in FIG. 1. As shown in FIG. 2, the method includes the following steps:

Step S102: Perform privacy content recognition on an original image.

The privacy content can be image content specified by a user, or can be at least one specified image content category, and all specific image content included in the content category can be considered as privacy content. The privacy content can be determined based on image content included in the original image and image content that the user wants to protect as privacy. For example, a face image included in the original image can be used as the privacy content, or all image content (such as faces and limb parts) belonging to a "human" category in the original image can be used as the privacy content to be recognized.

For example, during the privacy content recognition on the original image, the privacy content in the original image can be recognized by using a pre-generated recognition algorithm or model to determine whether the original image includes the specified privacy content.

In an example implementation, facial recognition can be performed on the original image, and if a face image is recognized, the recognized face image is used as the privacy content; and/or semantic analysis can be performed on text information in the original image, and in response to an analysis result being relevant to a user's privacy information, the text information is used as the privacy content.

In an implementation in which text information is used as the privacy content, the user can customize the privacy information in advance, and the privacy information can be one or more keywords. After text recognition is performed on the original image, if the semantic similarity between a meaning of the text information included in the original image and the keyword specified by the user is greater than a predetermined threshold, the recognized text information is used as the privacy content.

Step S104: In response to a privacy content being recognized, a local region including the privacy content is determined from the original image.

For example, after it is determined that the original image includes the privacy content, an image location of the privacy content can be determined, and a local region including the privacy content can be determined from the original image based on the image location.

Step S106: Perform privacy protection processing on image data for the determined local region, the privacy protection processing including at least one of image scrambling processing or image obfuscation processing.

The image scrambling processing refers to first generating to-be-scrambled encrypted data based on a hyperchaotic system, and then based on the to-be-scrambled encrypted data, processing the image data to be scrambled, so as to obtain scrambled image data.

In the present implementation, the image data for the local region can be encrypted by using a nonlinear hyperchaotic system to obtain encrypted image data; and then, the encrypted image data and the original image data for the local region can be superimposed to obtain scrambled image data, and the image data generated after the processing can be separately used as privacy-protected image data.

The nonlinear hyperchaotic system can be established in advance. For example, a corresponding 2D or 3D nonlinear hyperchaotic system can be established based on an image dimension of the original image, and the nonlinear hyperchaotic system can be used to generate encrypted data to be scrambled.

The image obfuscation processing refers to rearranging a sorting order of image data. By setting different obfuscation rules, obfuscation processing can be performed on image data by using different obfuscation methods.

In the present implementation, a data order of the image data for the local region can be rearranged to obtain obfuscated image data, and the image data generated after the processing can be separately used as privacy-protected image data.

In addition, in an example implementation, the image scrambling processing can, be performed on the image data for the determined local region before the image obfuscation processing, and image data generated after the final processing can be used as privacy-protected image data.

For example, the image data for the local region is encrypted by using a nonlinear hyperchaotic system to obtain encrypted image data; the encrypted image data and the original image data for the local region are superimposed to obtain scrambled image data; and a data order of the scrambled image data is rearranged to obtain obfuscated image data, and the obfuscated image data can be used as privacy-protected image data.

In some implementations, in an example implementation, image obfuscation processing can in some implementations be performed on the image data for the determined local region before image scrambling processing, and image data generated after the final processing can be used as privacy-protected image data.

For example, a data order of the image data for the local region is rearranged to obtain obfuscated image data; the obfuscated image data is encrypted by using a nonlinear hyperchaotic system to obtain encrypted image data; and the encrypted image data and the original image data for the local region are superimposed to obtain scrambled image data, and the scrambled image data can be used as privacy-protected image data.

In the above implementations, performing the image obfuscation processing on the image data for the local region or on the scrambled image data can include:

The image obfuscation processing is performed on the image data for the local region or on the scrambled image data generated based on the image data for the local region using a predetermined obfuscation circuit. In addition, the image obfuscation processing can in some implementations be performed by using a software obfuscation algorithm.

Step S108: Perform image compression processing on the data of the privacy-protected original image to generate data of a compressed image, and use the compressed image as image data to be transmitted or stored.

The compressed image can be applied to any application scenario among image transmission, image storage, and image restoration shown in FIG. 1.

The Joint Image Encryption Compression (JIEC) technology can be applied to the compressed image, that is, image encryption (image privacy protection processing: image scrambling processing and image obfuscation processing) and compression can be jointly considered. As such, when an attacker attacks the encrypted and compressed image, the attacker needs to perform not only decryption but also decompression, and therefore problem complexity increases exponentially. The attacker cannot crack the original image in a limited time without knowing an encryption method precisely.

Therefore, the image resulted from the image privacy protection method in the present implementation can be stored locally or uploaded to the cloud securely. In addition, restoration processing can be performed on the image to obtain the original image, thereby resolving problems such as site restoration and public opinion screening.

As the privacy-protected image in the present implementation is obtained by performing the image scrambling processing and/or the image obfuscation processing on the local region including the privacy content in the original image, a local region can be flexibly selected by specifying different privacy content. Such practice increases difficulty in image restoration from the privacy-protected image to some extent. As a result, it is difficult for an attacker to determine the privacy-protected local region image, and therefore the attacker cannot quickly decrypt the original image through a conventional decryption method.

In addition, by performing the privacy protection processing on the image in the local region, the amount of image data to be processed can be reduced. As such, a privacy protection processing speed can be increased, and the original image can be quickly restored by enabling a device with a legal permission to process less privacy protection data, thereby shortening a restoration processing time and restoring the original image.

According to the image privacy protection method provided in the implementation of the present specification, privacy content recognition is performed on an original image; in response to a privacy content being recognized, a local region including the privacy content is determined from the original image; privacy protection processing is performed on image data for the determined local region, the privacy protection processing including at least one of image scrambling processing or image obfuscation processing; and image compression processing is performed on the privacy-protected original image, and the compressed image is used as an image to be transmitted or stored. Based on this, with privacy content flexibly specified, it is feasible to flexibly select, from an original image, image data in a local region on which privacy protection processing is to be performed, thereby improving the privacy protection strength for the original image, and easily realizing restoration of the original image.

The present implementation extends and supplements the image privacy protection method shown in FIG. 2.

Figure 3:
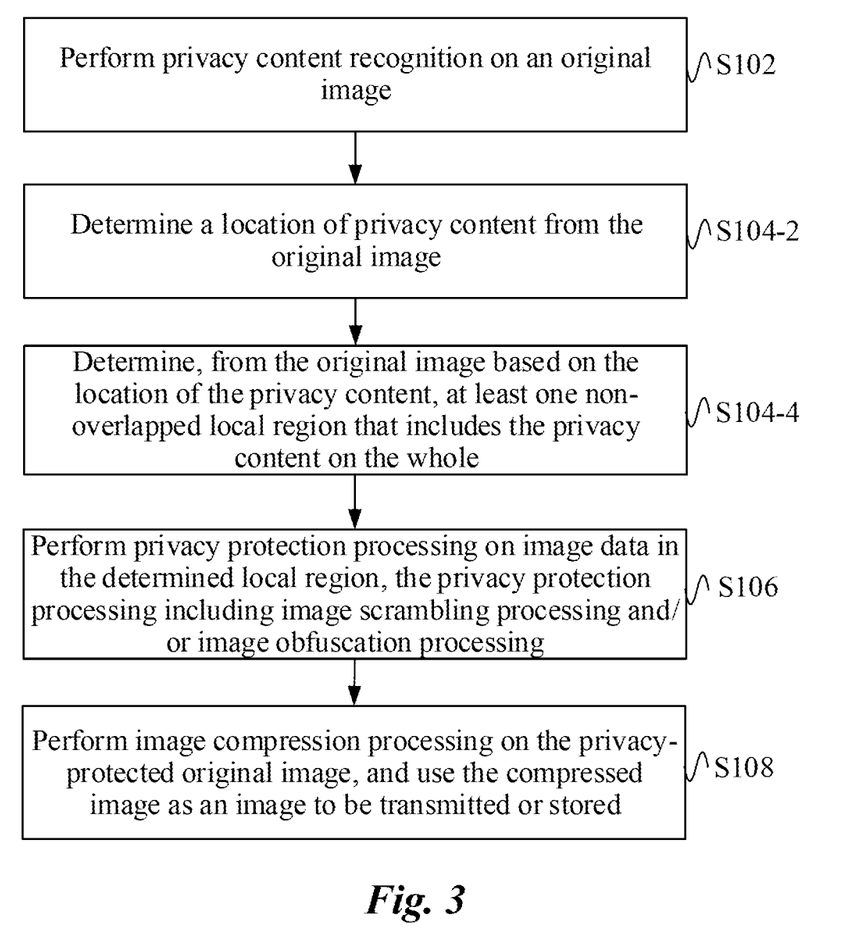
FIG. 3 is schematic flowchart 2 illustrating an image privacy protection method according to an implementation of the present specification.

In an example implementation, as shown in FIG. 3, step S104 above can include the following steps:

S104-2: Determine a location of the privacy content from the original image.

For example, the privacy content included in the original image can be recognized by using a pre-generated recognition algorithm or model to determine the location of the privacy content from the original image.

S104-4: Determine, from the original image based on the location of the privacy content, at least one non-overlapped local region that includes the privacy content on the whole.

For example, when locations of privacy content included in an original image correspond to a large region or scattered regions, multiple non-overlapped local regions can be determined based on the locations of the privacy content. A region formed by adding these local regions includes the locations of the privacy content in the original image on the whole.

For example, the at least one non-overlapped local region can be determined based on a region size occupied by the location of the recognized privacy content. If the region is large, the region can be divided into multiple smaller local regions. Further, based on a distribution of the location of the recognized privacy content in the original image, locations of centrally distributed privacy content can be classified into the same local region, and locations of scattered privacy content can be classified into different local regions.

In an example implementation, in response to the privacy content being a face image, a closed region can be formed through boundaries of a location of each face image on the original image, and a regular-pattern region including the closed region in the original image can be used as one local region, each local region including only one closed region.

For example, considering that sizes of faces included in one original image are usually relatively uniform, a location of each face separately forms one local region. When boundaries of the local region are determined, a closed region can be first formed through boundaries of the location of the face, and a regular-pattern region including the closed region in the original image can be used as one local region. The regular-pattern region can be a rectangular region. To minimize a region area occupied by the rectangular region and reduce the amount of data to be calculated in subsequent privacy protection processing, the rectangular region can be formed by using the maximum and minimum horizontal and vertical coordinates of the closed region as the boundaries. In addition, using the regular-pattern region as one local region can facilitate labeling, storage, and calculation of data coordinates within the region, thereby improving efficiency of the subsequent processing.

Further, in any image privacy protection method described above, in response to at least two non-overlapped local regions being determined from the original image as including the privacy content, respective image data of non-overlapped local regions of the at least two non-overlapped local regions is processed differently in at least one of image scrambling processing or image obfuscation processing in the privacy protection processing.

For example, when at least two non-overlapped local regions including the privacy content are determined from the original image, and when the image scrambling processing is selected to perform the privacy protection processing on the image data for the local region, not all of the different local regions use the same image scrambling processing method; and when at least two non-overlapped local regions including the target content are determined from the original image, and when the image obfuscation processing is selected to perform the privacy protection processing on the image data for the local region, not all of the different local regions use the same image obfuscation processing method.

According to the image privacy protection method provided in the implementation of the present specification, privacy content recognition is performed on an original image; in response to a privacy content being recognized, a local region including the privacy content is determined from the original image; privacy protection processing is performed on image data for the determined local region, the privacy protection processing including at least one of image scrambling processing or image obfuscation processing; and image compression processing is performed on the privacy-protected original image, and the compressed image is used as an image to be transmitted or stored. Based on this, with privacy content flexibly specified, it is feasible to flexibly select, from an original image, image data in a local region on which privacy protection processing is to be performed, thereby improving the privacy protection strength for the original image, and easily realizing restoration of the original image.

Figure 4:
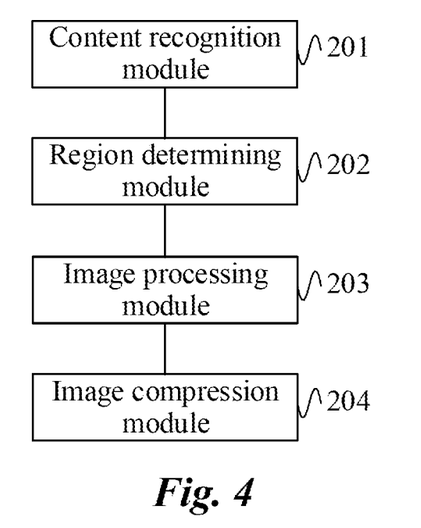
FIG. 4 is a schematic diagram illustrating a module composition of an image privacy protection apparatus according to an implementation of the present specification.

Corresponding to the image privacy protection method described in FIG. 2 and FIG. 3 above, based on the same technical concept, an implementation of the present specification further provides an image privacy protection apparatus. FIG. 4 is a schematic diagram illustrating a module composition of an image privacy protection apparatus according to an implementation of the present specification. The apparatus is configured to implement the image privacy protection method described in FIG. 2 and FIG. 3. As shown in FIG. 4, the apparatus includes the following modules: a content recognition module 201, configured to perform privacy content recognition on an original image; a region determining module 202, configured to, in response to a privacy content being recognized, determine a local region including privacy content from the original image; an image processing module 203, configured to perform privacy protection processing on image data for the determined local region, the privacy protection processing including at least one of image scrambling processing or image obfuscation processing; and an image compression module 204, configured to perform image compression processing on the data of the privacy-protected original image to generate data of a compressed image, and use the compressed image as image data to be transmitted or stored.

Further, the content recognition module 201 performs facial recognition on the original image, and in response to a face image being recognized, uses the recognized face image as the privacy content; and/or performs semantic analysis on text information of the original image, and in response to an analysis result being relevant to a user's privacy information, uses the text information as the privacy content.

Further, the image processing module 203 encrypts the image data for the local region by using a nonlinear hyperchaotic system to obtain encrypted image data, and superimposes the encrypted image data and the original image data for the local region to obtain scrambled image data; or rearranges a data order of the image data for the local region to obtain obfuscated image data.

Further, the image processing module 203 encrypts the image data for the local region by using a nonlinear hyperchaotic system to obtain encrypted image data, superimposes the encrypted image data and the original image data for the local region to obtain scrambled image data; and rearranges a data order of the scrambled image data to obtain obfuscated image data; or rearranges a data order of the image data for the local region to obtain obfuscated image data; encrypts the obfuscated image data by using a nonlinear hyperchaotic system to obtain encrypted image data; and superimposes the encrypted image data and the original image data for the local region to obtain scrambled image data.

Further, the image processing module 203 performs the image obfuscation processing on the image data for the local region or on the scrambled image data, including: the image processing module 203 performs the image obfuscation processing on the image data for the local region or on the scrambled image data generated based on the image data for the local region using a predetermined obfuscation circuit.

Further, the region determining module 202 determines a location of the privacy content from the original image; and determines, from the original image based on the location of the privacy content, at least one non-overlapped local region that includes the privacy content on the whole.

Further, in response to the privacy content being a face image, the region determining module 202 forms a closed region through boundaries of a location of each face image on the original image, and uses a regular-pattern region including the closed region in the original image as a local region, each local region including only one closed region.

Further, if the region determining module 202 determines at least two non-overlapped local regions including the privacy content from the original image, not all of the local regions have their respective image data experience the same image scrambling processing and/or image obfuscation processing during the privacy protection processing performed by the image processing module 203.

Further, the image compression module 204 performs overall encryption processing on the data of the privacy-protected original image to generate data of overall encrypted original image, and performs the image compression processing on the data of the overall encrypted original image.

According to the image privacy protection apparatus provided in the implementation of the present specification, privacy content recognition is performed on an original image; in response to a privacy content being recognized, a local region including the privacy content is determined from the original image; privacy protection processing is performed on image data for the determined local region, the privacy protection processing including at least one of image scrambling processing or image obfuscation processing; and image compression processing is performed on the privacy-protected original image, and the compressed image is used as an image to be transmitted or stored. Based on this, with privacy content flexibly specified, it is feasible to flexibly select, from an original image, image data in a local region on which privacy protection processing is to be performed, thereby improving the privacy protection strength for the original image, and easily realizing restoration of the original image.

It should be noted that, the implementations related to the image privacy protection apparatus in the present specification are based on the same inventive concept as the implementations related to the image privacy protection method in the present specification. Therefore, for example implementing of the implementations, reference can be made to the implementing of the corresponding image privacy protection method described above, and details are omitted for simplicity.

Figure 5:
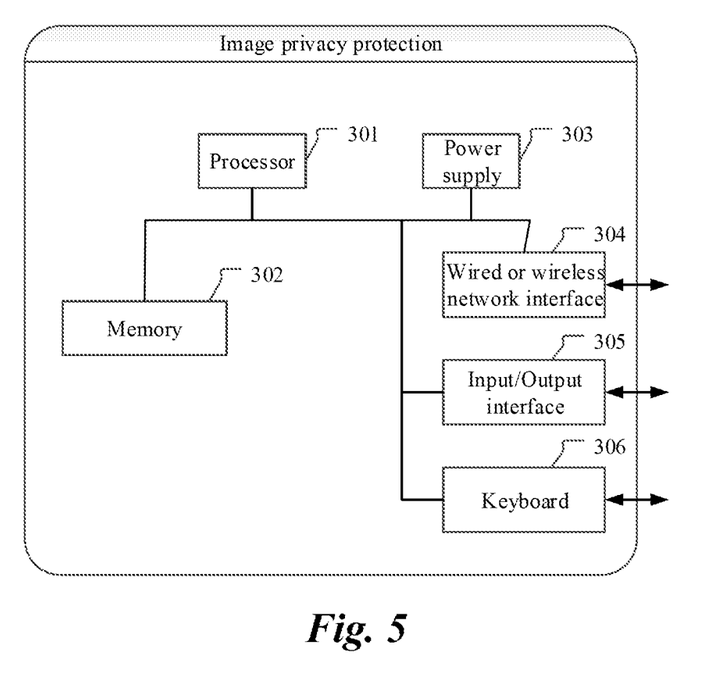
FIG. 5 is a schematic structural diagram illustrating an image privacy protection device according to an implementation of the present specification.

Corresponding to the image privacy protection method described in FIG. 2 and FIG. 3 above, based on the same technical concept, an implementation of the present specification further provides an image privacy protection device. The device is configured to perform the image privacy protection method described above. FIG. 5 is a schematic structural diagram illustrating an image privacy protection device according to an implementation of the present specification.

As shown in FIG. 5, a relatively great difference can be generated in the image privacy protection device because of a configuration or performance difference. The image privacy protection device can include one or more processors 301 and a memory 302, and the memory 302 can store one or more application programs or data. The memory 302 can be used for transient storage or persistent storage. The application program stored in the memory 302 can include one or more modules (not shown in the figure), and each module can include a series of computer-executable instructions in the image privacy protection device. Further, the processor 301 can be disposed to communicate with the memory 302, and execute, on the image privacy protection device, a series of computer-executable instructions in the memory 302. The image privacy protection device can further include one or more power supplies 303, one or more wired or wireless network interfaces 304, one or more input/output interfaces 305, one or more keyboards 306, and the like.

In an example implementation, the image privacy protection device includes a memory and one or more programs that are stored in the memory, the one or more programs can include one or more modules, each module can include a series of computer-executable instructions in the image privacy protection device, and the one or more processors can be configured to execute the one or more programs that include computer-executable instructions for performing the following: performing privacy content recognition on an original image; in response to a privacy content being recognized, determining a local region including the privacy content from the original image; performing privacy protection processing on image data for the determined local region to generate data of a privacy-protected original image, the privacy protection processing including at least one of image scrambling processing or image obfuscation processing; and performing image compression processing on the data of the privacy-protected original image to generate data of a compressed image, and using the compressed image as image data to be transmitted or stored.

In some implementations, when the computer-executable instructions are executed, the performing the privacy content recognition on the original image includes at least one of: performing facial recognition on the original image, and in response to a face image being recognized, using the recognized face image as the privacy content; or performing semantic analysis of text information in the original image, and in response to an analysis result being relevant to a user's privacy information, using the text information as the privacy content.

In some implementations, when the computer-executable instructions are executed, the performing the privacy protection processing on the image data for the determined local region includes at least one of: encrypting the image data for the local region by using a nonlinear hyperchaotic system to obtain encrypted image data, and superimposing the encrypted image data and the original image data for the local region to obtain scrambled image data; or rearranging a data order of the image data for the local region to obtain obfuscated image data.

In some implementations, when the computer-executable instructions are executed, the performing the privacy protection processing on the image data for the determined local region includes at least one of: encrypting the image data for the local region by using a nonlinear hyperchaotic system to obtain encrypted image data, superimposing the encrypted image data and the original image data for the local region to obtain scrambled image data, and rearranging a data order of the scrambled image data to obtain obfuscated image data; or rearranging a data order of the image data for the local region to obtain obfuscated image data; encrypting the obfuscated image data by using a nonlinear hyperchaotic system to obtain encrypted image data; and superimposing the encrypted image data and the original image data for the local region to obtain scrambled image data.

In some implementations, when the computer-executable instructions are executed, performing the image obfuscation processing on the image data for the local region or on the scrambled image data includes: performing the image obfuscation processing on the image data for the local region or on the scrambled image data generated based on the image data for the local region using a predetermined obfuscation circuit.

In some implementations, when the computer-executable instructions are executed, the determining the local region including the privacy content from the original image includes: determining a location of the privacy content from the original image; and determining, from the original image based on the location of the privacy content, at least one non-overlapped local region that includes the privacy content on the whole.

In some implementations, when the computer-executable instructions are executed, the determining, from the original image based on the location of the privacy content, the at least one non-overlapped local region that includes the privacy content on the whole includes: in response to the privacy content being a face image, forming a closed region through boundaries of a location of each face image on the original image, and using a regular-pattern region including the closed region in the original image as a local region, each local region including only one closed region.

In some implementations, when the computer-executable instructions are executed, in response to at least two non-overlapped local regions being determined from the original image as including the privacy content, respective image data of non-overlapped local regions of the at least two non-overlapped local regions is processed differently in at least one of image scrambling processing or image obfuscation processing in the privacy protection processing.

In some implementations, when the computer-executable instructions are executed, the performing the image compression processing on the data of the privacy-protected original image to generate data of a compressed image includes: performing overall encryption processing on the data of the privacy-protected original image to generate data of overall encrypted original image, and performing the image compression processing on the data of the overall encrypted original image.

According to the image privacy protection device provided in the implementation of the present specification, privacy content recognition is performed on an original image; in response to a privacy content being recognized, a local region including the privacy content is determined from the original image; privacy protection processing is performed on image data for the determined local region, the privacy protection processing including at least one of image scrambling processing or image obfuscation processing; and image compression processing is performed on the privacy-protected original image, and the compressed image is used as an image to be transmitted or stored. Based on this, with privacy content flexibly specified, it is feasible to flexibly select, from an original image, image data in a local region on which privacy protection processing is to be performed, thereby improving the privacy protection strength for the original image, and easily realizing restoration of the original image.

It should be noted that, the implementations related to the image privacy protection device in the present specification are based on the same inventive concept as the implementations related to the image privacy protection method in the present specification. Therefore, for example implementing of the implementations, reference can be made to the implementing of the corresponding image privacy protection method described above, and details are omitted for simplicity.

Similar to the image privacy protection method described in FIG. 2 and FIG. 3 above, based on similar technical concepts, an implementation of the present specification further provides a storage medium for storing computer-executable instructions. In an example implementation, the storage medium can be a USB flash drive, an optical disc, a hard disk, or the like. When the computer-executable instructions stored in the storage medium are executed by a processor, the following process can be implemented: performing privacy content recognition on an original image; in response to a privacy content being recognized, determining a local region including the privacy content from the original image; performing privacy protection processing on image data for the determined local region to generate data of a privacy-protected original image, the privacy protection processing including at least one of image scrambling processing or image obfuscation processing; and performing image compression processing on the data of the privacy-protected original image to generate data of a compressed image, and using the compressed image as image data to be transmitted or stored.

In some implementations, when the computer-executable instructions stored in the storage medium are executed by the processor, the performing the privacy content recognition on the original image includes at least one of: performing facial recognition on the original image, and in response to a face image being recognized, using the recognized face image as the privacy content; or performing semantic analysis on text information of the original image, and in response to an analysis result being relevant to a user's privacy information, using the text information as the privacy content.

In some implementations, when the computer-executable instructions stored in the storage medium are executed by the processor, the performing the privacy protection processing on the image data for the determined local region includes at least one of: encrypting the image data for the local region by using a nonlinear hyperchaotic system to obtain encrypted image data, and superimposing the encrypted image data and the original image data for the local region to obtain scrambled image data; or rearranging a data order of the image data for the local region to obtain obfuscated image data.

In some implementations, when the computer-executable instructions stored in the storage medium are executed by the processor, the performing the privacy protection processing on the image data for the determined local region includes at least one of: encrypting the image data for the local region by using a nonlinear hyperchaotic system to obtain encrypted image data, superimposing the encrypted image data and the original image data for the local region to obtain scrambled image data, and rearranging a data order of the scrambled image data to obtain obfuscated image data; or rearranging a data order of the image data for the local region to obtain obfuscated image data; encrypting the obfuscated image data by using a nonlinear hyperchaotic system to obtain encrypted image data; and superimposing the encrypted image data and the original image data for the local region to obtain scrambled image data.

In some implementations, when the computer-executable instructions stored in the storage medium are executed by the processor, performing the image obfuscation processing on the image data for the local region or on the scrambled image data includes: performing the image obfuscation processing on the image data for the local region or on the scrambled image data generated based on the image data for the local region using a predetermined obfuscation circuit.

In some implementations, when the computer-executable instructions stored in the storage medium are executed by the processor, the determining the local region including the privacy content from the original image includes: determining a location of the privacy content from the original image; and determining, from the original image based on the location of the privacy content, at least one non-overlapped local region that includes the privacy content on the whole.

In some implementations, when the computer-executable instructions stored in the storage medium are executed by the processor, the determining, from the original image based on the location of the privacy content, the at least one non-overlapped local region that includes the privacy content on the whole includes: in response to the privacy content being a face image, forming a closed region through boundaries of a location of each face image on the original image, and using a regular-pattern region including the closed region in the original image as a local region, each local region including only one closed region.

In some implementations, when the computer-executable instructions stored in the storage medium are executed by the processor, in response to at least two non-overlapped local regions being determined from the original image as including the privacy content, respective image data of non-overlapped local regions of the at least two non-overlapped local regions is processed differently in at least one of image scrambling processing or image obfuscation processing in the privacy protection processing.

In some implementations, when the computer-executable instructions stored in the storage medium are executed by the processor, the performing the image compression processing on the data of the privacy-protected original image to generate data of a compressed image includes: performing overall encryption processing on the data of the privacy-protected original image to generate data of overall encrypted original image, and performing the image compression processing on the data of the overall encrypted original image.

When the computer-executable instructions stored in the storage medium provided in the implementation of the present specification are executed by the processor, privacy content recognition is performed on an original image; in response to a privacy content being recognized, a local region including the privacy content is determined from the original image; privacy protection processing is performed on image data for the determined local region, the privacy protection processing including at least one of image scrambling processing or image obfuscation processing; and image compression processing is performed on the privacy-protected original image, and the compressed image is used as an image to be transmitted or stored. Based on this, with privacy content flexibly specified, it is feasible to flexibly select, from an original image, image data in a local region on which privacy protection processing is to be performed, thereby improving the privacy protection strength for the original image, and easily realizing restoration of the original image.

It should be noted that, the implementations related to the storage medium in the present specification are based on the same inventive concept as the implementations related to the image privacy protection method in the present specification. Therefore, for example implementing of the implementations, reference can be made to the implementing of the corresponding image privacy protection method described above, and details are omitted for simplicity.

Example implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing are feasible or can be advantageous.

In the 1990s, whether a technical improvement was a hardware improvement (for example, an improvement to a circuit structure, such as a diode, a transistor, or a switch) or a software improvement (an improvement to a method procedure) could be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code can be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. For example, the computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the implementations of the present specification are implemented, a function of each unit can be implemented in one or more pieces of software and/or hardware.

A person skilled in the art should understand that one or more implementations of the present specification can be provided as a method, a system, or a computer program product. Therefore, the one or more implementations of the present application can use a form of hardware only implementations, software only implementations, or implementations with a combination of software and hardware. Moreover, the present specification can use a form of a computer program product that is implemented on one or more computer-usable storage media (including but not limited to a disk memory, a CD-ROM, an optical memory, etc.) that include computer-usable program code.

The present specification is described with reference to the flowcharts and/or block diagrams of the methods, the devices (systems), and the computer program products based on the implementations of the present specification. It should be noted that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded to the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more central processing units (CPU), an input/output interface, a network interface, and a memory.

The memory may include a non-persistent memory, a random access memory (RAM), and/or a non-volatile memory in a computer readable medium, for example, a read-only memory (ROM) or a flash read-only memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present specification, the computer readable medium does not include computer readable transitory media (transitory media) such as a modulated data signal and a carrier.

It should be further noted that, the terms "include," "comprise," or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The one or more implementations of the present specification can be described in common contexts of computer-executable instructions executed by a computer, such as a program module. Generally, the program module includes a routine, a program, an object, a component, a data structure, etc., executing a specific task or implementing a specific abstract data type. The one or more implementations of the present specification can also be practiced in distributed computing environments. In the distributed computing environments, tasks are performed by remote processing devices that are connected through a communications network. In a distributed computing environment, the program module can be located in both local and remote computer storage media including storage devices.

The implementations in the present specification are described in a progressive way. For same or similar parts of the implementations, references can be made to the implementations mutually. Each implementation focuses on a difference from other implementations. Particularly, a system implementation is similar to a method implementation, and therefore is described briefly. For related parts, references can be made to related descriptions in the method implementation.

The previous descriptions are merely implementations of the present specification, and are not intended to limit the present specification. A person skilled in the art can make various modifications and changes to the present specification. Any modification, equivalent replacement, or improvement made without departing from the spirit and principle of the present specification shall fall within the scope of the claims in the present specification.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An image privacy protection method, comprising:
performing privacy content recognition on an original image;
in response to a privacy content being recognized, determining a local region including the privacy content from the original image;
performing privacy protection processing on image data for the local region to generate data of a privacy-protected original image; and
performing image compression processing on the data of the privacy-protected original image to generate data of a compressed image, and using the data of the compressed image as image data to be transmitted or store,
wherein the performing the privacy protection processing on the image data for the local region includes at least one of:
encrypting the image data for the local region by using a nonlinear hyperchaotic system to obtain first encrypted image data, superimposing the first encrypted image data and the image data for the local region to obtain first scrambled image data, and rearranging a data order of the first scrambled image data to obtain first obfuscated image data; or
rearranging a data order of the image data for the local region to obtain second obfuscated image data, encrypting the second obfuscated image data by using a nonlinear hyperchaotic system to obtain second encrypted image data, and superimposing the second encrypted image data and the image data for the local region to obtain second scrambled image data.

2. The method according to claim 1, wherein the performing the privacy content recognition on the original image includes at least one of:
performing facial recognition on the original image, and in response to a face image being recognized, using the face image as the privacy content; or
performing semantic analysis on text information of the original image, and in response to an analysis result of the semantic analysis being relevant to a user's privacy information, using the text information as the privacy content.

3. The method according to claim 1, wherein the rearranging the data order of the first scrambled image data and the rearranging the data order of the image data for the local region is each performed by using a predetermined obfuscation circuit.

4. The method according to claim 2, wherein the determining the localregion including the privacy content from the original image includes:
determining a location of the privacy content from the original image; and
determining, from the original image based on the location of the privacy content, at least one non-overlapped local region that includes the privacy content on the whole.

5. The method according to claim 4, wherein the determining, from the original image based on the location of the privacy content, the at least one non-overlapped local region that includes the privacy content on the whole includes: in response to the privacy content being one or more face images, forming a closed region through boundaries of a location of each face image on the original image, and using a regular-pattern region including the closed region in the original image as a local region, each local region including only one closed region.

6. The method according to claim 4, wherein: in response to at least two non-overlapped local regions being determined from the original image as including the privacy content, respective image data of non-overlapped local regions of the at least two non-overlapped local regions are processed differently in at least one of the image scrambling processing or the image obfuscation processing in the privacy protection processing.

7. The method according to claim 1, wherein the performing the image compression processing on the data of the privacy-protected original image to generate the data of the compressed image includes:
performing overall encryption processing on the data of the privacy-protected original image to generate data of overall encrypted original image, and
performing the image compression processing on the data of the overall encrypted original image.

8. An image privacy protection apparatus, comprising:
a content recognition module, configured to perform privacy content recognition on an original image;
a region determining module, configured to, in response to a privacy content being recognized, determine a local region including the privacy content from the original image;
an image processing module, configured to perform privacy protection processing on image data for the local region; and
an image compression module, configured to perform image compression processing on the data of the privacy-protected original image to generate data of a compressed image, and use the compressed image as image data to be transmitted or stored,
wherein the privacy protection processing on the image data for the local region includes at least one of:
encrypting the image data for the local region by using a nonlinear hyperchaotic system to obtain first encrypted image data, superimposing the first encrypted image data and the image data for the local region to obtain first scrambled image data, and rearranging a data order of the first scrambled image data to obtain first obfuscated image data; or
rearranging a data order of the image data for the local region to obtain second obfuscated image data, encrypting the second obfuscated image data by using a nonlinear hyperchaotic system to obtain second encrypted image data, and superimposing the second encrypted image data and the image data for the local region to obtain second scrambled image data.

9. An image privacy protection device, comprising:
a processor; and
a memory storing computer-executable instructions that, when executed by the processor, enable the processor to implement acts including:
performing privacy content recognition on an original image;
in response to a privacy content being recognized, determining a local region including the privacy content from the original image;
performing privacy protection processing on image data for the local region to generate data of a privacy-protected original image; and
performing image compression processing on the data of the privacy-protected original image to generate data of a compressed image, and using the data of the compressed image as image data to be transmitted or stored, wherein the performing the privacy protection processing on the image data for the localregion includes at least one of:

encrypting the image data for the local region by using a nonlinear hyperchaotic system to obtain first encrypted image data, superimposing the first encrypted image data and the image data for the local region to obtain first scrambled image data, and rearranging a data order of the first scrambled image data to obtain first obfuscated image data; or rearranging a data order of the image data for the local region to obtain second obfuscated image data, encrypting the second obfuscated image data by using a nonlinear hyperchaotic system to obtain second encrypted image data, and superimposing the second encrypted image data and the image data for the local region to obtain second scrambled image data.

10. The device according to claim 9, wherein the performing the privacy content recognition on the original image includes at least one of:

performing facial recognition on the original image, and in response to a face image being recognized, using the face image as the privacy content; or performing semantic analysis on text information of the original image, and in response to an analysis result of the semantic analysis being relevant to a user's privacy information, using the text information as the privacy content.

11. The device according to claim 9, wherein the rearranging the data order of the first scrambled image data and the rearranging the data order of the image data for the local region is each performed by using a predetermined obfuscation circuit.

12. The device according to claim 10, wherein the determining the localregion including the privacy content from the original image includes:

determining a location of the privacy content from the original image; and determining, from the original image based on the location of the privacy content, at least one non-overlapped local region that includes the privacy content on the whole.

13. The device according to claim 12, wherein the determining, from the original image based on the location of the privacy content, the at least one non-overlapped local region that includes the privacy content on the whole includes: in response to the privacy content being one or more face images, forming a closed region through boundaries of a location of each face image on the original image, and using a regular-pattern region including the closed region in the original image as a local region, each local region including only one closed region.

14. The device according to claim 12, wherein: in response to at least two non-overlapped local regions being determined from the original image as including the privacy content, respective image data of non-overlapped local regions of the at least two non-overlapped local regions are processed differently in at least one of the image scrambling processing or the image obfuscation processing in the privacy protection processing.

15. The device according to claim 9, wherein the performing the image compression processing on the data of the privacy-protected original image to generate the data of the compressed image includes:

performing overall encryption processing on the data of the privacy-protected original image to generate data of overall encrypted original image, and performing the image compression processing on the data of the overall encrypted original image.

16. A non-transitory storage medium having computer-executable instructions stored thereon that, when executed by a processor, configure the processor to implement acts including:

performing privacy content recognition on an original image;

in response to a privacy content being recognized, determining a local region including the privacy content from the original image;

performing privacy protection processing on image data for the local region to generate data of a privacy-protected original image; and performing image compression processing on the data of the privacy-protected original image to generate data of a compressed image, and using the compressed image as image data to be transmitted or stored, wherein the performing the privacy protection processing on the image data for the localregion includes at least one of:

encrypting the image data for the local region by using a nonlinear hyperchaotic system to obtain first encrypted image data, superimposing the first encrypted image data and the image data for the local region to obtain first scrambled image data, and rearranging a data order of the first scrambled image data to obtain first obfuscated image data; or rearranging a data order of the image data for the local region to obtain second obfuscated image data, encrypting the second obfuscated image data by using a nonlinear hyperchaotic system to obtain second encrypted image data, and superimposing the second encrypted image data and the image data for the local region to obtain second scrambled image data.

17. The non-transitory storage medium according to claim 16, wherein the performing the privacy content recognition on the original image includes at least one of:

performing facial recognition on the original image, and in response to a face image being recognized, using the face image as the privacy content; or performing semantic analysis on text information of the original image, and in response to an analysis result of the semantic analysis being relevant to a user's privacy information, using the text information as the privacy content.

18. The non-transitory storage medium according to claim 17, wherein the determining the local region including the privacy content from the original image includes:

determining a location of the privacy content from the original image; and determining, from the original image based on the location of the privacy content, at least one non-overlapped local region that includes the privacy content on the whole.

19. The non-transitory storage medium according to claim 18, wherein the determining, from the original image based on the location of the privacy content, the at least one non-overlapped local region that includes the privacy content on the whole includes: in response to the privacy content being one or more face images, forming a closed region through boundaries of a location of each face image on the original image, and using a regular-pattern region including the closed region in the original image as a local region, each local region including only one closed region.

20. The non-transitory storage medium according to claim 18, wherein: in response to at least two non-overlapped local regions being determined from the original image as including the privacy content, respective image data of non-overlapped local regions of the at least two non-overlapped local regions are processed differently in at least one of the image scrambling processing or the image obfuscation processing in the privacy protection processing.

* * * * *